US008535064B2

(12) United States Patent
Linton

(10) Patent No.: US 8,535,064 B2
(45) Date of Patent: Sep. 17, 2013

(54) METHOD AND APPARATUS FOR CYCLIC VARIATIONS IN ALTITUDE CONDITIONING

(75) Inventor: Carl E. Linton, Temecula, CA (US)

(73) Assignee: CVAC Systems, Inc., Temecula, CA (US)

( * ) Notice: Subject to any disclaimer, the term of this patent is extended or adjusted under 35 U.S.C. 154(b) by 1267 days.

(21) Appl. No.: 10/659,997

(22) Filed: Sep. 11, 2003

(65) Prior Publication Data

US 2005/0056279 A1 Mar. 17, 2005

(51) Int. Cl.
*G09B 25/00* (2006.01)
*A61G 10/00* (2006.01)

(52) U.S. Cl.
USPC .......... 434/372; 128/202.12

(58) Field of Classification Search
USPC .......... 434/29, 34, 55, 247, 365, 219, 366, 434/372; 472/68; 128/202.11, 202.12, 205.16, 128/205.26, 204; 95/8; 62/259.1; 706/12; 52/6
See application file for complete search history.

(56) References Cited

U.S. PATENT DOCUMENTS 3,073,040 A * 1/1963 Schueller .......... 434/34
3,309,684 A 3/1967 Kahn et al.
4,227,524 A * 10/1980 Galerne .......... 128/205.26
4,427,385 A * 1/1984 Galerne .......... 434/29
4,678,438 A * 7/1987 Vykukal .......... 434/34
4,777,974 A * 10/1988 Swift et al. .......... 137/14
4,835,983 A * 6/1989 Chandler et al. .......... 62/259.1
5,101,819 A 4/1992 Lane
5,318,018 A * 6/1994 Puma et al. .......... 128/202.11
5,360,001 A * 11/1994 Brill et al. .......... 128/205.26
5,462,504 A * 10/1995 Trulaske et al. .......... 482/7
5,467,764 A * 11/1995 Gamow .......... 128/202.12
5,490,784 A * 2/1996 Carmein .......... 434/55

(Continued)

FOREIGN PATENT DOCUMENTS

FR 2640878 A1 6/1990
JP 60-232178 11/1985

(Continued)

OTHER PUBLICATIONS

CVAC Systems What's New [online]. Dec. 1, 2002 [retrieved on Jun. 28, 2007]. Retrieved from the Internet: <URL: http://web.archive.org/web/20021201231932/cvacsystems.com/What's+New.htm>.*

(Continued)

*Primary Examiner* — Xuan Thai
*Assistant Examiner* — Jerry-Daryl Fletcher

(57) ABSTRACT

A method and apparatus for cyclic variations in altitude condition that allows a user to rest in a pressure vessel while undergoing rapid variations or transitions between simulated altitudes. The pressure vessel comprises a blower to generate negative pressure, and a proportional valve to allow air back into the pressure vessel in order to relieve the negative pressure. An on-board interface, kiosk controller and master controller are all in electrical communication with each other in order to enable a user to implement a program of cyclic variations in altitude conditioning that is suitable to the specific user, and enables an operator to bill the user for such services, as well as to allow the user to use a different pressure vessel without re-entering data, so long as such data was originally entered and stored, and the different pressure vessel is in electrical communication with the master controller. A user sensor monitors the user during a session, such that the program may be modified or replaced with another program in real time, according to the user's needs.

45 Claims, 5 Drawing Sheets

(56) References Cited

U.S. PATENT DOCUMENTS

| | | | | |
|---|---|---|---|---|
| 5,503,143 | A | 4/1996 | Marion et al. | |
| 5,531,644 | A * | 7/1996 | Marumo | 472/68 |
| 5,718,587 | A * | 2/1998 | Sussingham | 434/34 |
| 5,727,950 | A * | 3/1998 | Cook et al. | 434/350 |
| 5,799,562 | A | 9/1998 | Weinberg | |
| 5,899,846 | A * | 5/1999 | Sternberg et al. | 600/21 |
| 6,364,765 | B1 * | 4/2002 | Walker et al. | 463/16 |
| 6,565,624 | B2 * | 5/2003 | Kutt et al. | 95/8 |
| 6,656,091 | B1 * | 12/2003 | Abelbeck et al. | 482/9 |
| 6,719,564 | B2 * | 4/2004 | Than et al. | 434/34 |
| 6,899,103 | B1 | 5/2005 | Hood et al. | |
| 6,945,911 | B2 * | 9/2005 | Jackowski | 482/9 |
| 2002/0007836 | A1 * | 1/2002 | Weyergans | 128/898 |
| 2002/0035927 | A1 | 3/2002 | Kutt et al. | |
| 2002/0083025 | A1 * | 6/2002 | Robarts et al. | 706/12 |
| 2003/0205230 | A1 * | 11/2003 | Shusterman et al. | 128/205.26 |
| 2004/0006926 | A1 * | 1/2004 | Neeley et al. | 52/6 |
| 2004/0112375 | A1 | 6/2004 | Boykin | |
| 2004/0261796 | A1 * | 12/2004 | Butler | 128/205.26 |
| 2005/0000520 | A1 | 1/2005 | Silman et al. | |
| 2005/0008991 | A1 * | 1/2005 | Hebert et al. | 434/29 |
| 2005/0056279 | A1 | 3/2005 | Linton | |
| 2005/0056285 | A1 | 3/2005 | Harris | |
| 2005/0261615 | A1 | 11/2005 | Weston | |
| 2007/0184034 | A1 | 8/2007 | Linton | |
| 2007/0193578 | A1 | 8/2007 | Linton | |
| 2007/0209668 | A1 | 9/2007 | Linton | |

FOREIGN PATENT DOCUMENTS

| | | | |
|---|---|---|---|
| JP | 08-154982 | A | 6/1996 |
| JP | 2003-310800 | | 11/2003 |
| JP | 2004-202156 | | 7/2004 |
| RU | 2112486 | C1 | 6/1998 |
| RU | 2132179 | C1 | 6/1999 |
| RU | 2139024 | C1 | 10/1999 |
| WO | WO 79/00526 | A1 | 8/1979 |
| WO | WO 96/14792 | A1 | 5/1996 |
| WO | WO 97/03631 | A1 | 2/1997 |
| WO | WO 2004/047710 | A1 | 6/2004 |

OTHER PUBLICATIONS

CVAC Systems What is CVAC? [online]. Dec. 1, 2002 [retrieved on Jun. 28, 2007]. Retrieved from the Internet: <URL: http://web.archive.org/web/20021201230242/cvacsystems.com/What+is+CVAC.htm>.*

CVAC Systems Background/Development [online]. Dec. 1, 2002 [retrieved on Jun. 28, 2007]. Retrieved from the Internet: <URL: http://web.archive.org/web/20021201191441/cvacsystems.com/Background.htm>.*

CVAC Systems Frequently Asked Questions [online]. Dec. 1, 2002 [retrieved on Jun. 28, 2007]. Retrieved from the Internet: <URL: http://web.archive.org/web/20021201230602/cvacsystems.com/CVAC+FAQ. htm>.*

CVAC Systems Testimonials [online]. Feb. 14, 2003 [retrieved on Jun. 28, 2007]. Retrieved from the Internet: <URL: http://web.archive.org/web/20030214231411/cvacsystems.com/testimonials.htm>.*

CVAC Systems Art [online]. Feb. 3, 2003 [retrieved on Jun. 28, 2007]. Retrieved from the Internet: <URL: http://web.archive.org/web/20030203555847/cvacsystems.com/testimonials-art.htm>.*

Linton, Carl; "Kiosk Rental Letter"; Letter; Approximately May 2002; San Diego, CA.

"New & Exciting Adventure in Exercise!", CVAC Press Release; Approximately Oct. 2001; San Diego, CA.

"CVAC Coupon"; Advertisement; Approximately Aug. 2002; San Diego, CA.

"Intreducing CVAC", CVAC, Press Release; Approximately Jan. 2002; San Diego, CA.

"Introducting the CVAC Process", CVAC Press Release: Approximately Nov. 2001; San Diego, CA.

Elton, S., "CVAC: The Next Wave fin Altitude Training," http://www.trinewbies.com, cited on http://web.archive.org between Jun. 5, 2002 and Aug. 6, 2002.

Reid, W., "Device Enhances Performances for Local Athletes," http://www.SignOnSanDiego.com, Aug. 25, 2002.

PCT/US08/56999 Search Report dated Aug. 18, 2008.

PCT/US07/03524 Search Report dated Sep. 8, 2008.

Beidleman et al., "Substrate oxidation is altered in women during exercise upon acute altitude exposure," Medicine & Science in Sports & Exercise 34(3):430-437 (2002).

Boyanov et al., "Testosterone supplementaion in men with type 2 diabetes, visceral obesity and partial androgen deficiency," The Aging Male, 6(1):1-7 (2003).

Brubaker et al., "Adventure Travel and Type I Diabetes: The Complicating Effects of High Altitude," Diabetes Care 28(10):2563-2572 (2005).

Hu et al., "Comparisons of serum testosterone and corticosterone between exercise training during normoxia and hypobaric hypoxia in rats," Eur. J. Applied Physiol. 78(5):417-421 (1998) (Abstract).

Pavan et al., "Metabolic and Cardiovascular Parameters in Type I Diabetes at Extreme Altitude," Med. Sci. Sports Exerc. 36(8):1283-1289 (2004).

PCT/US08/54923 Search Report dated Aug. 1, 2008.

Rodriguez et al., "Erythropoietin acute reaction and haematological adaptations to short, intermittent hypobaric hypoxia," Eur. J. Appl. Physiol. 82:170-177 (2000).

Schmidt et al., "Effects of Intermittent Exposure to High Altitude on Blood Volume and Erythropoietic Activity," High Altitude Medicine & Biology 3(3):167-176 (2002).

Singh et al., "High Variability of Glycated Hemoglobin Concentrations in Patients with IDDM Followed Over 9 Years," Diabetes Care 20(3):306-308 (1997).

Tin'Kov et al., Effects of intermittant hypobaric hypoxia on blood lipid concentrations in male coronary heart disease patients, High Altitude Medicine & Biology 3(3):277-282 (2002).

First Office Action for Chinese Patent Application No. 200480025897.8 (English translation), issued on Mar. 6, 2009; 8 pages.

Examiner's First Report for Australian Patent Application No. 2004280153, mailed on Jun. 5, 2009; 2 pages.

Office Action for Japanese Patent Application No. 2006-526066 (English translation), mailed on Oct. 20, 2009; 3 pages.

Supplementary European Search Report in European Patent Application No. 04756811.8, mailed on Mar. 12, 2010; 4 pages.

International Search Report and Written Opinion for PCT/US04/21987, mailed on Mar. 29, 2007.

Office Action for European Application No. 04756811.8, mailed on Jul. 7, 2010.

Examiner's Second Report for Australian Patent Application No. 2004280153, mailed on Mar. 2, 2011.

Examiner's Third Report for Australian Patent Application No. 2004280153, mailed on Mar. 7, 2011.

Office Action for Korean Patent Application No. 10-2006-7004975, mailed on Mar. 18, 2011.

Office Action for Indian Patent Application No. 1039/delnp/2006, mailed on Sep. 16, 2011.

Serebrovskaya, T., "Intermittent Hypoxia Research in the Former Soviet Union and the Commonwealth of Independent States: History and Review of the Concept and Selected Applications,"High Altitude Medicine & Biology, vol. 3, No. 2, 2002, 17 pages.

Hetzler, R. et al., "The Effect of Dynamic Intermittent Hypoxic Conditioning on Arterial Oxygen Saturation," Wilderness and Environmental Medicine, vol. 20, 2009, 7 pages.

Herbst, K. et al., "Pilot Study: rapidly cycling hypobaric pressure improves pain after 5 days in adiposis dolorosa," Journal of Pain Research, vol. 3, 2010, 7 pages.

Katayama, K. et al., "Intermittent Hypoxia Improves Endurance Performance and Submaximal Exercise Efficiency," High Altitude Medicine & Biology, vol. 4, No. 3, 2003, 14 pages.

Makley, J. et al., "The Effect of Reduced Barometric Pressure on Fracture Healing in Rats," The Journal of Bone & Joint Surgery, vol. 49-A, No. 5, 1967, 13 pages.

Office Action for Canadian Patent Application No. 2,542,664, mailed on Apr. 3, 2012.

* cited by examiner

METHOD AND APPARATUS FOR CYCLIC VARIATIONS IN ALTITUDE CONDITIONING

BACKGROUND OF THE INVENTION

The present invention is directed to a system and method for cyclic variations in altitude conditioning using a pressure vessel capable of transitioning its internal pressure in response to a computer program. One such use for such a system and method is for physical conditioning.

As physical conditioning has become increasingly important to people, companies have become increasingly interested in developing exercise equipment to appeal to this market. With continued research and development, exercise equipment has improved dramatically in complexity and sophistication. Where companies once offered only weights, they now offer a variety of equipment designed for cardiovascular or weight training. Consumers can choose equipment tailored to their specific physical conditioning needs. For example, consumers interested in indoor cardiovascular exercise can now choose from a variety of equipment offerings, including stationary bicycles, stair climbing simulators, treadmills, and rowing machines. Each of these types of equipment provides different advantages and disadvantages depending on a person's physical strengths and weaknesses. A person with a knee injury might choose a stationary bicycle over a treadmill or stair climbing simulator because the stationary bicycle provides cardiovascular exercise with less physical impact to the knees.

In addition to offering different types of exercise equipment, companies have also continually improved the flexibility of their designs such that they can be adjusted to provide multiple levels of difficulty. One of the simplest examples is a treadmill having an adjustable belt speed. Using this type of treadmill, runners can increase or decrease the belt speed depending on their level of conditioning and the type of training they want on a given day. Further, as a runner's physical conditioning increases with continued use of the treadmill, the runner can further increase the belt speed. Newer treadmills have even more advanced features, such as slope adjustments, which allow runners to increase the slope of the belt to simulate different types of hills.

The proliferation of electronics and electronic interfaces in particular has also greatly improved the designs of exercise equipment. Where users once adjusted mechanical levers and knobs to change the setup of a piece of exercise equipment, they now often use an electronic interface to perform the same tasks. For example, adding an electronic interface to a treadmill allows a user to quickly and easily program the belt speed, slope adjustment, length of the run, and other criteria both before and during the exercise. Further, an electronic interface may provide even more sophisticated features, such as allowing users to program in a series of hills with varying slopes into their workout routines and giving users the ability to save such programs to be accessed by personal identification information at any time subsequent. The addition of electronics to exercise equipment has dawned a new era in which many of the old design boundaries have been erased.

Even though electromechanical exercise systems have become more popular in recent years, companies have conducted minimal exploration into the advantages of electronically controlled pressure vessels in physical conditioning. Little research has been conducted on the beneficial effects of changing pressure on the human body for physical conditioning. Recent research into these beneficial effects has shown that exercise equipment involving pressure vessels has positive effects on the general health of humans. Therefore, there is a need for a system and method that can provide these benefits.

SUMMARY OF THE INVENTION

It is an object of the present invention to provide a system and method for cyclic variations in altitude conditioning.

It is another object of the present invention to provide a system and method for improving the physical fitness and general health of humans through the use of variations in pressure.

It is another object of the present invention to provide a system and method that allows a user to set up an exercise program tailored to the user's training goals and physical attributes.

It is another object of the present invention to provide a system and method that continually adjusts a user's exercise program with changes in that user's physical conditioning.

It is another object of the present invention to provide a system and method for safe physical conditioning.

It is another object of the present invention to provide a system and method for electronically charging a user for physical training sessions.

It is another object of the present invention to provide a system and method for storing all user data in a master database.

These and other objects are provided by a system and method for cyclic variations in altitude conditioning, including physical conditioning using a pressure vessel controlled by a computer system.

Pressure vessels have been used on humans for various purposes for many years. However, the typical approach to the use of these pressure vessels was to subject a person to sustained periods in a pressurized environment. Contrary to this typical approach, the underlying theory for the present invention is that the benefits to be derived from exposure to a pressure vessel results not from sustained exposure to a pressurized environment, but rather, to the transition between various simulated altitudes. In other words, one of the goals of the present invention is to provide conditioning to a human body through cyclic variations in altitude. By subjecting a person to transitions in simulated altitudes, the person is subjected to more than the mere exposure to a pressurized environment. In a system and method for cyclic variations in altitude conditioning, the person is exposed to transitions in pressure, temperature and oxygen levels. It is through this use of varying cyclic patterns of transitions between simulated altitudes that a person can more effectively derive the benefits of conditioning from a pressure vessel. It is believed that the transition between simulated altitudes creates a polarity shift in the cell walls of the human body, and that these transitions also impact the bioelectric frequency of the human body. Thus, the past practice of subjecting a person to sustained periods in a pressurized environment did not subject the person to multiple transitions between altitudes, as per the present invention.

The physical conditioning system in accordance with the present invention includes three types of components: a master controller, a kiosk controller, and a pressure vessel. Typically, the pressure vessel and kiosk controller reside at a user accessible facility, while the master controller resides at a secure facility. The kiosk controller is typically located external to the pressure vessel, but it is connected to the electrical system of the pressure vessel. The master controller is also electrically connected to the kiosk controller.

The pressure vessel is generally designed to enclose a person and expose that person to variations in pressure for a period of time for the purpose of physical conditioning. The shape of the vessel should facilitate rapid changes in its internal pressure. Therefore, it should generally have smooth, curved walls with no sharp angles or corners. For example, an egg-shaped pressure vessel is desirable.

The pressure vessel generally includes a canopy and a tub. When the canopy is lifted, the user may board the vessel. When the canopy is closed, it forms a hermetic seal with the tub when air is evacuated from the vessel. The canopy and tub have flanges on their outside edges, which align when the two portions of the vessel are brought into contact. A gasket lies between the flanges and helps facilitate a hermetic seal when the system is in operation. Further, the canopy has a window opening covered by a clear material to allow the user to see outside of the pressure vessel when it is closed.

The tub is securely fastened to a base, which has an upper surface designed to accept the shape of the tube and a flat lower surface that rests on the ground to prevent the tub from rolling or shifting during entry or use. The tub may be mounted to the base in an orientation that facilitates ease of entry. Further, the interior of the pressure vessel is designed to hold a person comfortably for an extended period of time. For example, the interior may comprise a seat, declining backrest, and arm rests.

The kiosk controller may further include software that controls one or more pressure vessels. It is electrically connected to a pressure transducer, blower, and proportioning valve. The kiosk controller monitors the pressure within the vessel using a pressure transducer mounted within the vessel. It can then regulate the pressure within the vessel using the blower and proportioning valve, which are connected to the vessel through a network of pipes. When the pressure vessel is closed, the kiosk controller can turn on the blower, which is located external to the vessel, to remove air from the vessel and pressurize it. To de-pressurize the vessel, the kiosk controller opens the proportioning valve, which is also located external to the vessel, allowing air to flow into the vessel. The proportioning valve is a pipe, which contains a piston connected to a rod driven by a linear motor. The pipe has a bore through its sidewall that allows air into it when the bore is not covered by the piston. Thus, the kiosk controller can regulate the pressure within the vessel by driving the linear motor to position the piston either over the bore or away from it.

The kiosk controller may further include software that allows a user to establish an account and setup an exercise program. The kiosk controller is typically connected to a user interface located external to the pressure vessel and an on-board user interface located within each pressure vessel attached to the system. Through the external user interface, users receive information about use of the system and its associated benefits, establish personalized accounts, provide payment information, and provide information that allows the kiosk controller to set up an exercise program tailored to the user's goals and physical attributes. The user may then choose to start a training session. The kiosk controller indicates which pressure vessel the user should board. Once inside the pressure vessel, the user communicates with the kiosk controller through an on-board interface. The on-board interface allows a user to start an exercise program. After the session has started, the user may also use the on-board interface to place the session on hold or abort the session entirely if the user desires to exit the pressure vessel or experiences any discomfort.

The exercise program may include two different types of sessions: set up sessions and training sessions. Both types of sessions are executed in a progressive manner that allows a user to advance upon successful completion of a prior session. Set up sessions slowly acclimate a user to the pressure variations that the user will experience in his or her next full training session. Preferably, a user must successfully complete a series of set up sessions before proceeding with the next full training session. If a user aborts a set up session or indicates that he or she experienced any discomfort during the session, then the kiosk controller deems the session unsuccessful and adjusts the user's exercise program accordingly.

All user data may be periodically downloaded from the kiosk controllers at each facility to a master controller. The master controller is a server that stores all user information into a database for backup purposes and to allow users to move to and from different facilities without having to re-register each time.

BRIEF DESCRIPTION OF THE DRAWINGS

Reference is made to the following description taken in connection with the accompanying drawings, in which.

DETAILED DESCRIPTION OF A PREFERRED EMBODIMENT

Figure 1:
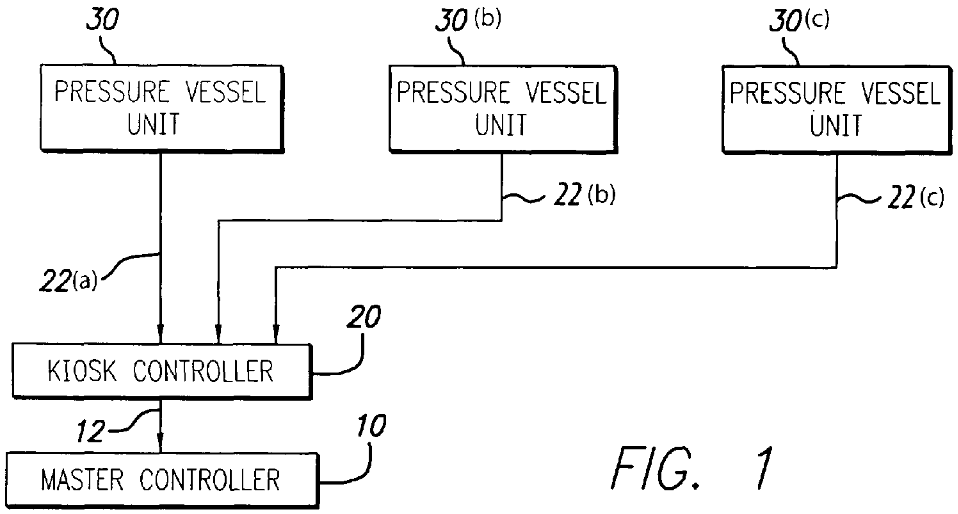
FIG. 1 is a schematic block diagram that illustrates components of a system and its respective connections.

Referring to FIG. 1, an embodiment of the present invention generally comprises three types of components: a master controller 10, a kiosk controller 20, and one or more pressure vessel units 30*a*, 30*b* and 30*c*. Master controller 10 communicates with kiosk controller 20 through an electrical connection 12. Kiosk controller 20 controls and communicates with pressure vessel units 30*a*, 30*b* and 30*c* through electrical connections 22*a*, 22*b* and 22*c*, respectively. Although these three types of components may be located all at the same location, or each at different locations, pressure vessel unit(s) 30 and kiosk controller 20 are typically located at a user accessible facility, while master controller 10 is typically located at a secure remote facility. For example, pressure vessel(s) 30 and kiosk controller 20 may be located at a health club and master controller 10 may be located at a separate facility entirely.

Figure 2:
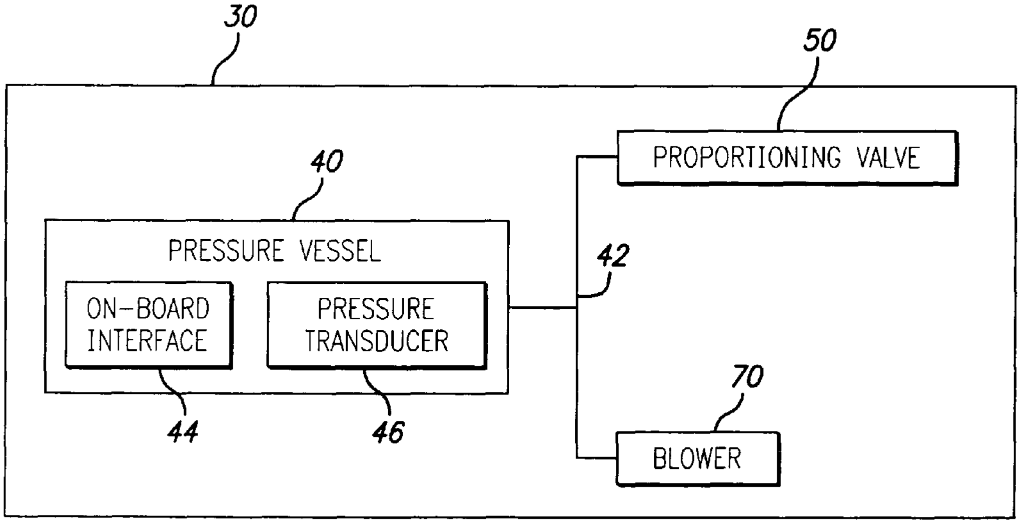
FIG. 2 is a schematic block diagram that illustrates components that comprise a pressure vessel unit.

Referring to FIG. 2, pressure vessel unit 30 is comprised of three main components: a pressure vessel 40, a proportioning valve 50, and a blower 70. Pressure vessel 40 comprises an enclosed apparatus in which a user sits during a training session. It typically contains an on-board interface 44 and a pressure transducer 46. Kiosk controller 20 (FIG. 1) controls the operations of pressure vessel unit 30 through electrical connections to each of its components, including the on-board interface 44, pressure transducer 46, proportioning valve 50, and blower 70. Specifically, kiosk controller 20 monitors the internal pressure of pressure vessel 40 using signals from pressure transducer 46. When kiosk controller 20 determines that a change in pressure is required, it operates blower 70 and proportioning valve 50 connected to pressure vessel 40 through a pipe network 42 to regulate the internal pressure of pressure vessel 40 accordingly.

Kiosk controller 20 further comprises a server (not shown), which contains software that is capable of gathering user information, setting up tailored exercise programs in accordance with that information, and operating pressure vessels 40 when those exercise programs are executed. Kiosk controller 20 is connected to a centralized user interface (not shown) located external to pressure vessel 40, which allows a user to receive information about the system, establish a personalized account, pay for training sessions, set up an exercise program, start a training session, and perform a variety of other functions related to use of the system.

Once a user has set up an exercise program, the user may choose to begin a training session. The external interface (not shown) directs the user to a particular pressure vessel 40 and the user boards that pressure vessel 40. Once inside the pressure vessel 40, the user communicates with kiosk controller 20 through the on-board interface 44. When a user starts a session by logging onto the on-board interface 44, kiosk controller 20 operates pressure vessel unit 30 in accordance with the user's exercise program. After the session begins, the user can place the session on hold or abort the session using the on-board interface 44. Upon the successful completion of a session, kiosk controller 20 allows the user to exit the pressure vessel 40 and updates the user's file. It is anticipated that kiosk controller 40 can be adapted to control more than one pressure vessel unit 30 at a time.

The kiosk controller 20 at each facility communicates with a master controller 10 through electrical connection 12. Master controller 10 further comprises a server (not shown) that periodically collects and stores user information from the kiosk controller 20 at each facility into a database (not shown). Using the master controller database, a user can have his or her file transferred to a kiosk controller 20 at any facility.

This section provides an overview of the basic interrelation of the components of the present invention. The following sections provide a more detailed description of the structure and function of each component, as well as the preferred methodology for cyclic variations in altitude conditioning.

The Pressure Vessel Unit

A pressure vessel may comprise a variety of different shapes. However, vessels with smooth curved shapes are advantageous for facilitating pressure changes accurately and quickly within the vessel, without creating excesses forces at any sharp edges of the vessel. The vessel should be large enough to enclose a user (typically a human, although the use of the present invention may be just as beneficial, if not more, for animals) in a sitting, lying, or other comfortable position, and its interior should allow the user to comfortably maintain that position for an extended period of time. The vessel should be fabricated from a material capable of withstanding rapid pressure changes. Preferably, the material should be relatively smooth such that the internal walls of the vessel facilitate laminar airflow.

Figure 3A:
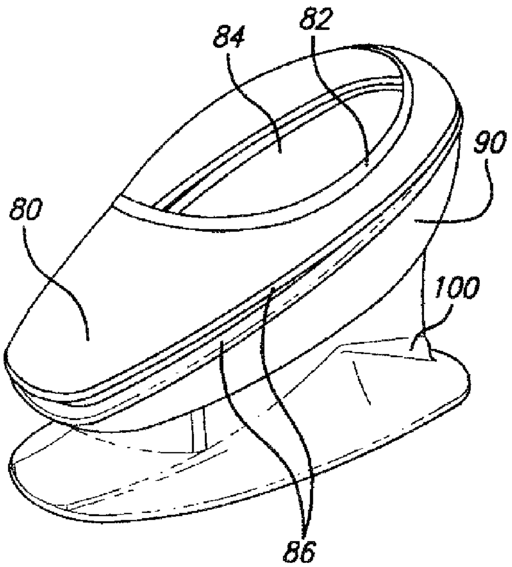
FIGS. 3*a*, 3*b*, and 3*c* show different perspective views of a pressure vessel.
Figure 3B:
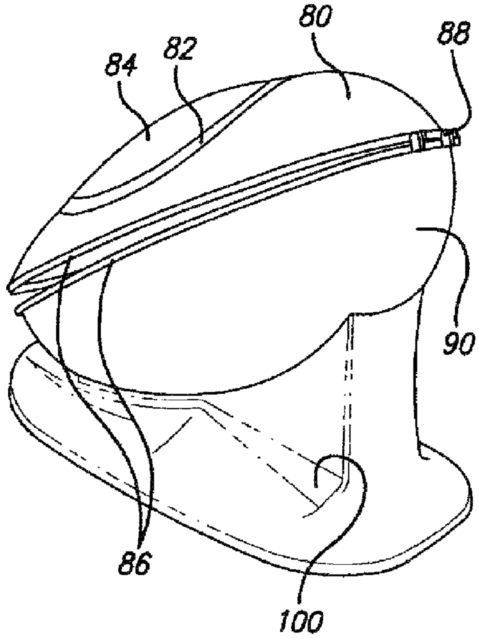
Figure 3C:
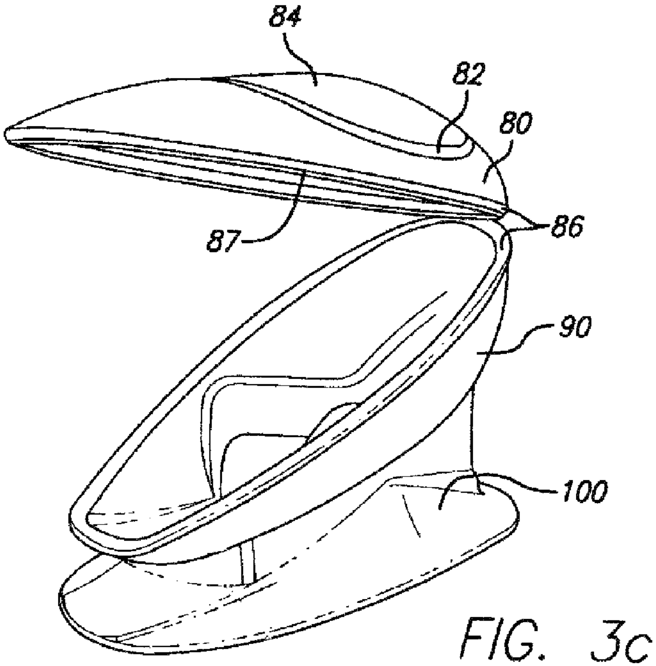

In a preferred embodiment of the present invention, pressure vessel 40 is egg-shaped as shown in FIGS. 3*a*, 3*b* and 3*c*. Referring to FIG. 3*a*, pressure vessel 40 is divided into a top portion, labeled a canopy 80, and a bottom portion, labeled a tub 90. Referring to FIG. 3*b*, canopy 80 is mounted to the tub 90 by a hinge 88 on one side. Thus, as shown in FIG. 3*c*, canopy 80 may be lifted up to allow a user to enter the vessel. Once inside the vessel, the user can pull down the canopy 80, and secure it with a clamp if necessary, to seal the vessel.

Further, canopy 80 includes a window 84 to prevent users from feeling claustrophobic. Window 84 is preferably mounted above the user's head to allow the user to see outside of the vessel and should be made of a strong, clear material, preferably acrylic. Window 84 is mounted to the vessel in a manner that facilitates a hermetic seal when the vessel is under a negative pressure. For example, as shown in FIG. 3*a*, canopy 80 has a first flange 82 inset around the circumference of the window opening. First flange 82 is shaped to fit the circumference of the window opening. It is made of a high strength, light weight material, preferably cast aluminum, to minimize the weight of canopy 80. First flange 82 is affixed to the inside rim of the window opening in canopy 80. Although it may be affixed to the canopy in a variety of different manners, it is generally bonded to canopy 80 using an adhesive. Window 84 is placed over the window opening in canopy 80 and affixed to the first flange 82, generally also using an adhesive. However, it should be noted that other methods of creating a window in canopy 80 while maintaining a hermetic seal within pressure vessel 40 may also be used.

Referring to FIG. 3*c*, second flanges 86 runs along the circumference of canopy 80 and tub 90 where the two portions of the vessel come into contact when the vessel is closed. Second flanges 86 are also typically made from cast aluminum and are also typically affixed to canopy 80 and tub 90 using an adhesive. FIG. 3*c* shows second flanges 86 to be continuous pieces of material having oval shapes. However, it should be noted that the shape of second flanges 86 depends on the shapes of canopy 80 and tub 90. Second flanges 86 are of similar sizes and shapes such that they align when pressure vessel 40 is closed to facilitate a hermetic seal. Further, each has a single, continuous groove along its center for holding a gasket 87. When pressure vessel 40 is closed, gasket 87 rests in between the grooves formed along the centers of second flanges 86. Gasket 87 is made from a material that would facilitate a hermetic seal between canopy 80 and tub 90 when closed, such as neoprene. To prevent the gasket from being removed, it may be mounted onto flange 86 by an adhesive. It is preferable to mount it to the upper second flange 86 on the canopy 80 such that it does not inhibit user entry.

Figure 4:
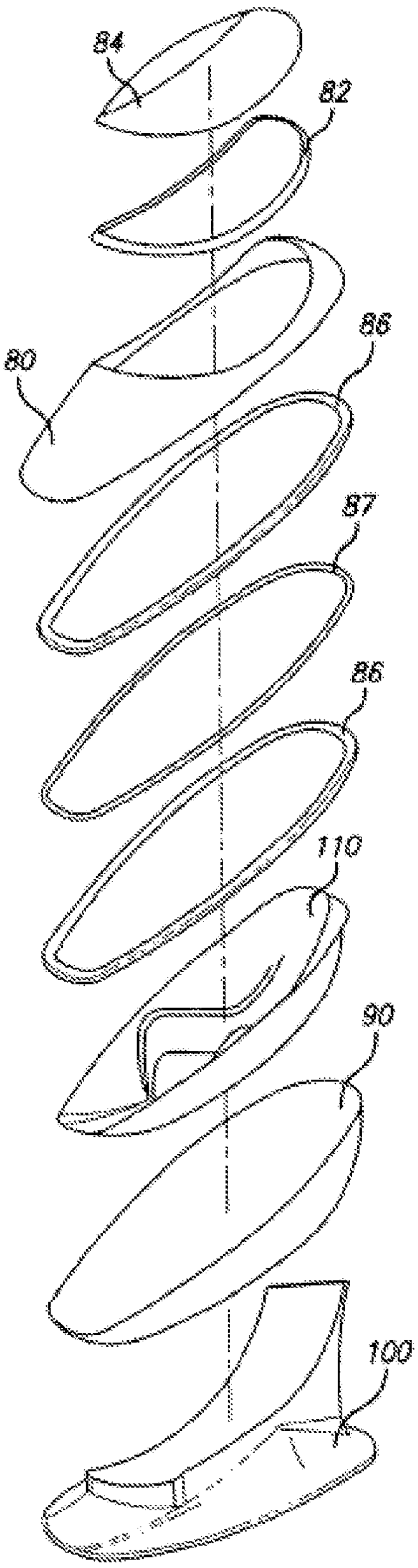
FIG. 4 shows an exploded view of a pressure vessel.

FIG. 4 shows an exploded view of the parts that comprise the pressure vessel 40. The interior of pressure vessel tub 90 is designed in a manner that allows a user to be comfortably positioned within the sealed vessel for the duration of a training session. For example, the interior may be designed to seat a user comfortably. One method of designing the interior of pressure vessel tub 90 is to fabricate a user supporting section with a seat 110 having a declining backrest and arm rests, which can be inset into tub 90. This section rests on the outer rim of the tub 90 under second flange 86 and gasket 87. However, it should be noted that any design that allows a user to be comfortably positioned during a training session, and any method of mounting such design within the pressure vessel 40 is acceptable as long as the vessel is capable of being pressurized once sealed.

Tub 90 is securely fastened to base 100, which has an upper surface designed to accept the shape of tub 90 and a flat lower surface that rests on the ground to prevent tub 90 from rolling or shifting during entry or use. Depending on the position of the user within tub 90, it may be mounted to a base 100 in an inclined position to allow a user to board pressure vessel 40 more easily and sit within it more comfortably. Tub 90 may be mounted to the base 100 using an adhesive or any other mounting method as long as it does not compromise the operation of the system. It should also be noted that the orientation of tub 90 with respect to base 100 may differ depending on the intended position of the user within pressure vessel 40.

Pressure vessel 40, user supporting section 110, and base 100 are preferably fabricated from fiberglass, which can be molded into the desired shape. Furthermore, fiberglass provides a high strength material capable of sustaining the weight of a human, while being able to withstanding rapid changes in pressure during the operation of the system. Finally, fiberglass is sufficiently light that the system remains reasonably transportable.

As previously described in FIG. 2, kiosk controller 20 regulates the pressure within pressure vessel 40 using proportioning valve 50, blower 70, and pipe network 42. These parts may be physically housed within base 100, which remains at atmospheric pressure during operation of the system, or they may be mounted external to pressure vessel 40.

The intake of blower 70 is connected through pipe network 42 to tub 90 with a hermetic seal. Through pipe network 42, blower 70 is able to remove air from pressure vessel 40 and hence, pressurize vessel 40 when closed. Pipe network 42 can be made of any material capable of sustaining air flow, but is preferably made from polyvinyl chloride ("PCV") due to the low cost and weight of the material. Pipe network 42 connects to tub 90 through a discretely placed opening in tub 90. For example, the opening may be placed in tub 90 under user supporting section 110 such that it is not visible to the user. The electrical connection of the blower is attached through a relay to a standard power outlet. The relay is connected to kiosk controller 20 enabling it to turn blower 70 on or off as needed to operate the system. If blower 70 requires three-phase voltage, a variable frequency driver may be connected between blower 70 and the power outlet to properly transform the voltage.

Proportioning valve 50 is also connected through pipe network 42 to tub 90 with a hermetic seal. Although pipe network 42 can be configured in a variety of different ways, one method of making the proper connections is to insert a "T"-shaped pipe between the intake of blower 70 and tub 90, and connect proportioning valve 50 to the third branch of the "T". The purpose of proportioning valve 50 is to de-pressurize vessel 40 by venting it to the atmosphere. Thus, when kiosk controller 20 is pressurizing vessel 40, it closes proportioning valve 50, and when it is de-pressurizing vessel 40, it opens proportioning valve 50 to allow air into pressure vessel 40.

Figure 5:
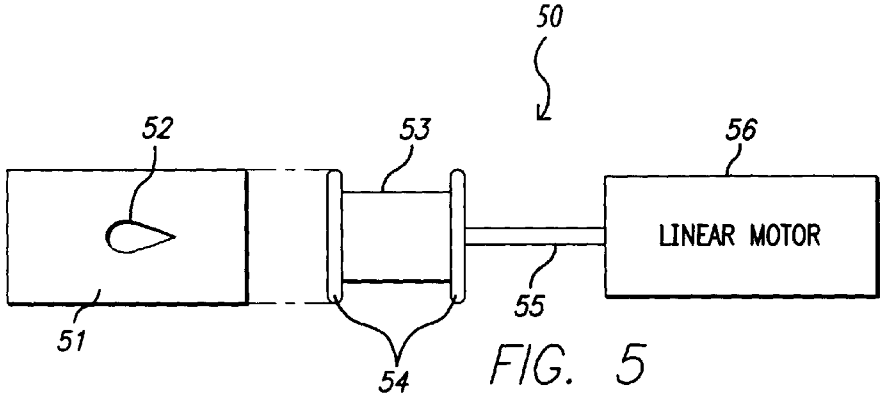
FIG. 5 is a diagram that illustrates the structure of a proportioning valve.

Referring to FIG. 5, proportioning valve 50 comprises a pipe 51 with at least one bore 52 in its sidewall, a piston 53, rings 54, a rod 55, and a linear motor 56. One side of pipe 51 is connected to tub 90, while the other side connects to linear motor 56, both with hermetic seals. Linear motor 56 drives rod 55, which moves piston 53 back and forth inside pipe 51. Piston 53 is preferably hollow and cylindrical. To minimize the driving force requirements of linear motor 56, piston 53 fits loosely within pipe 51, but has rings 54 mounted around the top and bottom ends of piston 53, which form a hermetic seal with the internal walls of pipe 51. Rings 54 fit into grooves along the circumference of the top and bottom of the piston, which hold rings 54 in place. Further, rings 54 are preferably made of Teflon™, or other material with high durability and low surface friction. However, it should be noted that rings 54 are not required, and the piston can also be designed to fit tightly against the internal walls of pipe 51 to facilitate a hermetic seal. Pipe 51, rod 55, and piston 53 are preferably made from metal, which is strong, durable, and capable of being machined to tight tolerances.

Bore 52 allows air into the vessel when it is not covered by piston 53. The shape and size of bore 52 depends upon the rate at which vessel 40 should be de-pressurized. For example, the larger the bore, the faster vessel 40 will de-pressurize. During operation of the system, kiosk controller 20 monitors the pressure inside vessel 40 through pressure transducer 46. When kiosk controller 20 pressurizes vessel 40, it turns on blower 70 and drives linear motor 56 to position piston 53 over bore 52 to prevent air from entering vessel 40. When kiosk controller 20 de-pressurizes vessel 40, it drives linear motor 56 to move piston 53 to expose part or all of bore 52 to air. Kiosk controller 20 controls the rate of de-pressurization by the amount of bore 52 it exposes to air. When vessel 40 has been sufficiently de-pressurized in accordance with the user's exercise program, kiosk controller 20 again moves piston 53 back over bore 52.

In an alternative embodiment, pipe 51 has a tear-drop shaped bore, which allows kiosk controller 20 to slowly or quickly de-pressurize vessel 40 with only slight adjustments to the position of piston 53. However, it should be noted that the shape of bore 52 or number of bores may be changed to obtain the desired rates of de-pressurization.

In a further embodiment, on-board interface 44, which is electrically connected to the kiosk controller 20, is mounted within pressure vessel 40. Although a touch-screen display is preferable for ease of use and space considerations, a display with any type of input device(s) can be used. It is convenient to mount on-board interface 44 to the top portion of the vessel in a location accessible by the user. However, the location of on-board interface 44 depends on the position of the user within pressure vessel 40 and space considerations. On-board interface 44 acts as the electronic interface through which the user receives information and sends instructions to kiosk controller 20 during operation of the system. The user typically is able to start a session, place a session on hold, or abort a session using on-board interface 44. Thus, if a user desires to exit the vessel or experiences discomfort during a session, the user is able to stop the program.

Figure 6:
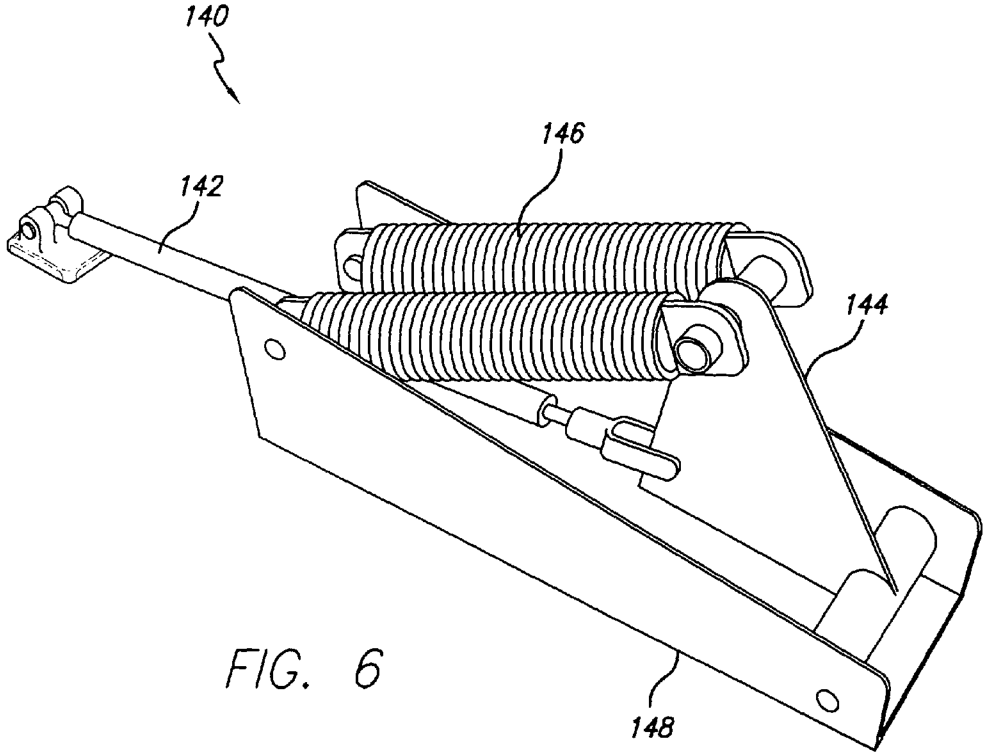
FIG. 6 is a diagram that illustrates the structure of a spring-loaded apparatus for opening and closing a pressure vessel.
Figure 7A:
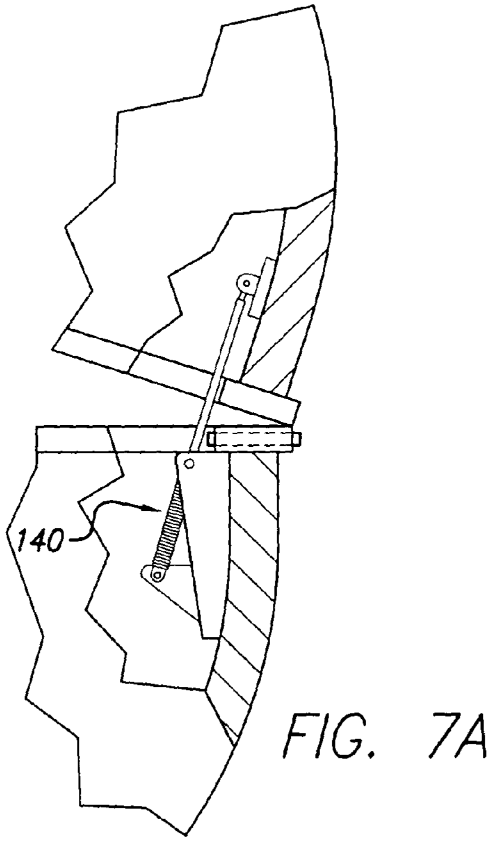
FIGS. 7*a* and 7*b* show the mounting of a spring-loaded apparatus within a pressure vessel, and its operation when the pressure vessel is in open and closed positions, respectively.
Figure 7B:
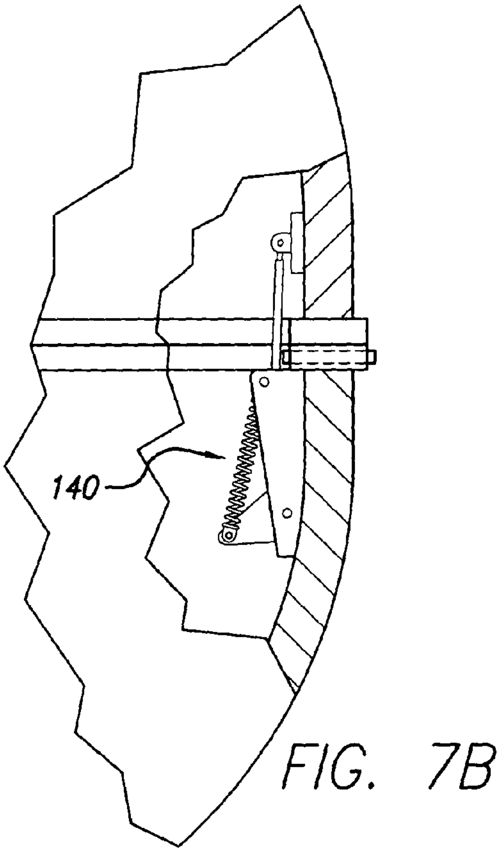

In another embodiment, referring to FIG. 6, canopy 80 and tub 90 are connected by a spring-loaded apparatus 140, which assists in the lifting of canopy 80 when it is not secured to tub 90 by a clamp or a negative pressure. Spring-loaded apparatus 140 includes rod 142, which pivotally connects to one comer of triangular bracket 144. One of the remaining comers of triangular bracket 144 is connected to springs 146 and the other is connected by an axle to mounting bracket 148. Mounting bracket 148 is then mounted to tub 90 and rod 142 is mounted to canopy 80 as shown in FIGS. 7*a* and 7*b*. When the canopy is closed, the rod is pressed towards tub 90 placing springs 146 in tension as shown in FIG. 7*b*. Springs 146 are selected such that they are capable of significantly assisting in the lifting of the weight of canopy 80 unless it is secured to tub 90 by a clamp or a negative pressure.

Figure 8:
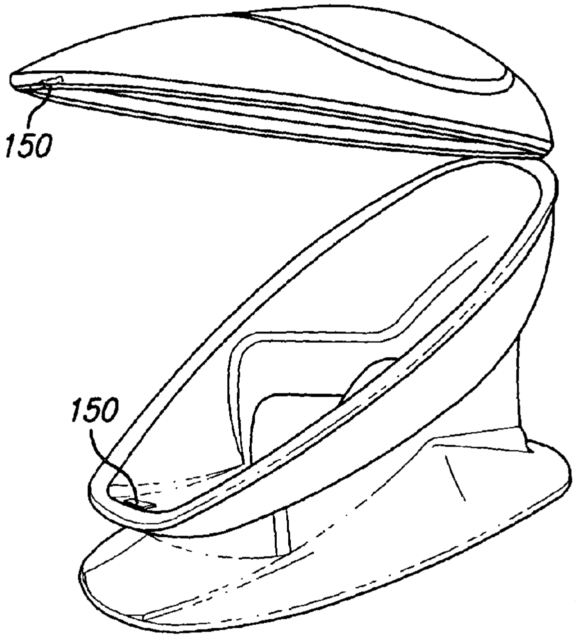
FIG. 8 shows the mounting of an electromagnetic clamp within a pressure vessel.

In another embodiment, referring to FIG. 8, canopy 80 and tub 90 also contain an electromagnetic clamp 150. One plate of electromagnetic clamp 150 is mounted to canopy 80 and the other plate is mounted to tub 90 on the sides opposite the hinge as shown in FIG. 8. Electro-magnetic clamp 150 is electrically connected to kiosk controller 20, which engages or disengages the clamp by turning power to the clamp on or off. Kiosk controller 20 engages the clamp 150 when a user has boarded and closed pressure vessel 40. However, Kiosk controller 20 disengages the clamp 150 either when pressure vessel 40 is under a negative pressure or when the system completes a session. However, it should be noted that many other types of clamps may also be used to secure pressure vessel 40 during a session. Further, it should also be noted that a clamp may not be needed unless pressure vessel 40 has a mechanism that would open the canopy if it were not secured.

In another embodiment, pressure vessel 40 has a burst panel (not shown) to prevent it from subjecting its user to dangerously high pressures in the event of a system malfunction. Basically, a small opening (not shown) is bored into canopy 80 or tub 90. A small panel (not shown) is mounted over the opening to prevent air from escaping. However, the panel is scored or otherwise weakened such that it would physically rupture if subjected to a certain maximum pressure. When the panel ruptures, vessel 40 de-pressurizes as air flows into the vessel through the opening. Although the panel may be constructed from any material as long as it will rupture when subjected to a certain pressure, it is commonly made from metal.

The Kiosk Controller

Kiosk controller 20 comprises a server that stores software necessary for a user to learn about the health benefits associated with using the present invention, to establish an account to pay for sessions, to set up an exercise program tailored to the user's personal information, to start a session, and to perform a variety of other functions related to use of the system. A typical kiosk controller will comprise a personal computer, such as an information processing system that runs on Microsoft's Windows operating system, or an information processing system that runs on Apple Computer's operating system. Further, kiosk controller 20 also stores the account, exercise program, and personal information for each user at a facility. Finally, the kiosk controller 20 stores all software necessary to operate one or more pressure vessels located at the facility. Thus, it is electrically connected to (i.e., in electrical communication with) the blower 70, proportioning valve linear motor 56, on-board pressure transducer 46, on-board interface 44, and any other electrical circuit or device attached to pressure vessel 40.

In an embodiment of the present invention, kiosk controller 20 is located separate from, but in close proximity to, one or more pressure vessels 40. In addition to being electrically connected to the electrical system of each pressure vessel 40, the kiosk controller 20 is also connected to one or more user interface terminals (not shown) located external to pressure vessel 40. These terminals are preferably touch-screen displays, but any device that receives information from users and displays information to users is appropriate. When it is not interfacing with a user, kiosk controller 20 may display an audio/visual presentation on the displays of these interface terminals explaining the health benefits users experience from training sessions. When a user begins interfacing with one of the terminals, the kiosk controller 20 asks the user to set up a personalized account, including log-on identification and password information. Kiosk controller 20 then asks the user a series of questions regarding the user's health, exercise patterns, goals, and a variety of other questions targeted at creating an exercise program tailored to the individual. When the user has provided a response to the last question, kiosk controller 20 processes the information and creates an exercise program. Finally, kiosk controller 20 provides sufficient warnings about the risks associated with use of the system, asks the user to electronically sign the appropriate legal document(s), and asks the user for payment information, such as credit card or debit card information. It should be noted that the sequence of questions above can occur in any order, and that the system is not limited to the described order. It should be further noted that steps may be added or subtracted from this sequence.

Each exercise program comprises two different parts. First, the user must successfully complete a "setup" session designed to slowly and cautiously acclimate the user to the varying levels of pressures to which the user will be exposed during the actual session. The user cannot bypass these "setup" sessions before moving on to the actual sessions. If the user successfully completes the "setup" session, then the user may start the actual sessions. The actual sessions are also progressive. Thus, when a user aborts a session or experiences a reasonable level of discomfort, the session is considered unsuccessful. In these cases, the user must either repeat the session or request that kiosk controller 20 modify the session until it better fits the user's abilities. Each session comprises a series of pressure changes (i.e., transitions between simulated altitudes) that vary in level of pressurization, length each level of pressurization is sustained, and rate at which pressurization occurs. Kiosk controller 20 creates each session, varying each of these factors in cycles, depending on the particular individual. These sessions can be a variety of different lengths of time, but 20 minutes is a standard length.

When a user opts to start an exercise program, kiosk controller 20 provides instructions on how to safely board a pressure vessel, which pressure vessel to board, and how to use on-board interface 44 once inside vessel 40. If canopy 80 is electrically or electro-magnetically operated, as discussed in a previous embodiment of the present invention, kiosk controller 20 will also release the canopy 80 open for the user. Similarly, once the user closes canopy 80, kiosk controller 20 may secure it. After the user has boarded and closed the vessel, kiosk computer 20 resumes displaying its audio/visual presentation to attract new users. However, kiosk controller 20 is also receiving commands from the user via the on-board interface 44 and pressure vessel 40 in response to those commands. Thus, if the user starts a session, kiosk controller 20 operates blower 70 and proportioning valve 50 to pressurize and de-pressurize vessel 40 in accordance with the user's particular exercise program. If the system has the electromagnetic clamp 150, then kiosk controller 20 may disable it, allowing canopy 80 to remain shut under the negative pressure within vessel 40. When the session ends, canopy 80 may be opened by the user, or if canopy 80 and tub 90 are connected by spring-loaded apparatus 140, canopy 80 may be opened with the assistance of the springs.

The Master Controller

Master controller 10 comprises a server capable of communicating with kiosk controller 20 at each facility via electrical connection 12. A typical master controller will comprise a personal computer, such as an information processing system that runs on Microsoft's Windows operating system, or an information processing system that runs on Apple Computer's operating system. Master controller 10 contains software allowing it to periodically download and store all user account, personal, and exercise program information in an organized database from all kiosk controllers 20 connected to the master controller 10. Master controller 10 fulfills several crucial roles. If a kiosk controller 20 should fail, master controller 10 can easily replace the data needed by users at that facility. Further, if a user should move from one facility to another, that user can easily download his or her account information to the kiosk controller 20 at the new facility to continue training sessions.

Methodology

The methodology is basically a set of targets with defined transitions. Some of the terms relating to this methodology are defined below for a better understanding of the methodology.

A Program: Every user will respond in a unique manner to changes in air pressure, temperature and oxygen levels that occur during cyclic variations in altitude conditioning. This necessitates a customized approach to delivering a highly effective and efficacious Program to each user. Accordingly, a user is categorized into a group of users having similar body-types with similar characteristics. The Program consists of a set of sessions, which are administered to the user as a serial round or cycle. This means that a user may have a session that they start and repeat a given number of times and then proceed to the next scheduled session which will be repeated a given number of times. There will be a set of sessions, each of which will have a repetition schedule. The sessions are delivered in a scheduled order, which repeats itself like a loop. So the user is administered one session at a time for a specified number of times. Then the user is administered the next scheduled session a specified number of times. This process is repeated until the user is administered the last element of the scheduled sessions set. When the requisite number of repetitions have been accomplished, the process repeats itself beginning at the first element of the scheduled sessions set. This comprises a Cyclic Variations in Altitude Conditioning (CVAC) Program.

A Session: A Session comprises a set of targets which are pressures found in the natural atmosphere. These targets are delivered in a precise order. The starting point and ending point in any CVAC Session is preferably the ambient pressure at the delivery site. The targets inherent in any CVAC Session are connected or joined together by clearly defined transitions. These transitions are either rises in pressure or falls in pressure. The nature of any transition may be characterized by the function of "delta P/T" (change in pressure over time). All transitions produce a waveform. The most desirable waveforms are Sine, Trapezoidal and Square. The entire collection of targets and transitions are preferably delivered in a twenty minute CVAC Session.

A Set-Up Session: The Set-Up Session may also be considered a Program. The Set-Up Session is not body-type specific. It is a single Session designed to prepare a new user for the more aggressive maneuvers or transitions encountered in the subsequent Sessions that the user will undergo. The Set-Up Session accounts for all ages and sizes and conditions, and assumes a minimal gradient per step exercise that allows the ear structures to be more pliant and to allow for more comfortable equalization of pressure in the ear structures. The purpose of the Set-Up Session is to prepare a new user for their custom Program based upon the group into which they have been placed. The function of the Set-Up Session is to qualify a user as being capable of adapting to multiple pressure changes in a given Session with acceptable or no discomfort. This is accomplished by instituting a gradient scale increase in pressure targets from very slight to larger increments with slow transitions increasing until a maximum transition from the widest difference in pressure targets is accomplished with no discomfort. The structure of the Set-Up Session is as follows: as with any Session, the starting point and ending point is preferably at ambient pressure. A target equivalent to 1000 ft above ambient is accomplished via a smooth linear (trapezoidal) transit. A second target equivalent to 500 ft less than the first target is accomplished via a slow to moderate sine wave transit. These two steps are repeated until the user returns a "continue" or "pass" reply via an on-board interface. When the user has indicated that they are prepared to continue, the initial target (1000 ft) is increased by a factor of 500 ft, making it 1500 ft. The secondary target (500 ft less than the first target) remains the same throughout the session until the exit stage is reached. Each time the user indicates that they are ready to increase their gradient, the target is increased by a factor of 500 ft. At this time, the transits would remain the same but the option of increasing gradient (shorter time factor) in the transits may be made available. A user should have the option of resuming a lower gradient if desired. There can be an appropriate icon or pad that allows for this option on the on-board interface display screen. Preferably, the Set-Up Session should not last longer than 20 minutes. A descent stage of the Program would initialize at 19 minutes and take the user on a staged descent. This would be characterized by a slow, 1000 ft sine wave descent transits with re-ascenaions of 500 ft at each step. At any time during the staged descent, the user could interrupt the descent and hold a given level or resume a previous level until comfort was achieved. The user would indicate a "continue" on the descent and the staging would resume. This stepping would continue until ambient pressure was reached whereupon the canopy would be opened such that the user could exit the pressure vessel. The Set-Up Session would be considered a new user's Program until the user is able to fully complete the Set-Up Session (that is to continue the targets and transits to the highest gradient) with no interrupts or aborts. When the user is ready to "graduate" from the Set-Up Session Program, they are duly acknowledged and informed that their next Program will be their special training Program customized for their body type and metabolism. Their file will be adjusted at the master controller and the next Session they get will be the one that corresponds to the group into which they were placed.

The Interrupt: During any phase in a Session wherein a user desires to stop the Session at that point for a short time, they may do so by activating an icon or other appropriate device on the on-board interface touch screen or control pad. This will hold the Session at the stage of interruption for a predetermined time period, such as a minute, at which time the Session will continue automatically. A Session can be interrupted 3 times after which a staged descent will occur and the user will be required to exit the pressure vessel. The user's file will be flagged and the user will be placed back on the Set-Up Sessions until they can satisfactorily complete it. A warning or reminder may be displayed on the screen each time an interrupt is used that informs the user of how many times interrupt has been used and the consequences of further use.

The Abort: When a user wishes to end a Session immediately and quickly exit the pressure vessel, the abort function can be activated. Touching the "abort" icon on the on-board interface touch pad/screen enables this option. A secondary prompt is activated acknowledging the command and asking the user if they are sure they want to abort. The user indicates their commitment to the command by pressing "continue" or "yes". The Program is aborted and a linear moderate descent is accomplished to ambient pressure whereupon the canopy opens and the user exits. The user's file is flagged. The next time the user comes in for their Session, the user is asked whether the abort was caused by discomfort. If yes, the user is placed back on the Set-Up Session Program. If no, the user is asked if they wish to resume their regularly scheduled Session. The client is given the option of resuming their regularly scheduled Session or returning to the Set-Up Session.

As mentioned above, a user is categorized into a group of users having similar body-types with similar characteristics. In the implementation of present embodiment, there are 12 body types taken into consideration. These body types are based upon considerations derived from the Ayurveda (a Hindic system of health that dates back greater than 6 thousand years) and additional considerations derived from the "endotherm" and "ectotherm" body types of more modern times, as well as trial-and-error observations. There are 3 basic groups that make up the body of the 12 basic groups. These 3 basic groups are designated "R", "B" and "G". It may be useful to note that R can be correlated with the element of "pita" in the Ayurveda. B can be correlated with the element of "kapha" and G can be correlated to the element of "vata". Typically, no particular body can be completely confined to a single group, such as an "absolute B". Rather, there are 12 distinct groups that are based on the combinations of the 3 basic elements. The bodies that correlate to the individual groups (i.e. "rbg") have attributes that are consistent and predictable in the way they react to patterns of change in any environment into which they are placed. Accordingly, there are specific programs or patterns that these individuals can be subjected to that will produce consistent and predictable results.

The 12 categories or groups of body types to which we refer above are the 12 essential combinations of the 3 primary components (b, r and g) of each group: (1) rbg, (2) rgb, (3) r<g=b, (4) r>g=b, (5) bgr, (6) brg, (7) b<g=r, (8) b>g=r, (9) gbr, (10) grb, (11) g<b=r and (12) g>b=r. These groups/categories are not in any particular order, but are numbered just to illustrate that there are 12 being taken into consideration.

Additional background information on Ayurveda, incorporated herein by reference, can be found in the books: *The Yoga of Herbs, Ayurvedic Guide*, by Dr. David Frawley and Dr. Vasant Ladd, and *The Ayurveda Encyclopedia: Natural Secrets to Healing, Prevention and Longevity*, by Swami Sada Shiva Tirtha. Additionally, information on endotherm (an animal whose body heat is regulated by internal physiological mechanisms), and ectotherm (an animal that derives much of its body heat from external heat sources) is available on the internet, and can be found through a simple search of these terms.

Thus, each body type (i.e. gbr) has attributes and qualities that make it predictable. Also, all living systems recognize, evaluate and respond with the best survival tactics, to patterns of change in environment. Accordingly, patterns are created that cause the particular body-type to respond with the optimal survival tactic(s). Additionally, movement can be incorporated within the general pattern to ensure that the living system creates "continuous" responses and does not devolve into a static or stable system of response. All users are different. Users respond in different ways to different things.

A classification exam is given to a new user to determine their body type. Below is an example of a typical questionnaire in current use. Variations of this exam may be used, and should produce similarly accurate results. All of the questions on the exam should be answered otherwise the user may not be properly classified. If all the questions are answered, a valid classification should be obtained. The parenthetical designations of R, G or B following the answers below are typically not displayed on the user's questionnaire. However, they are displayed below to provide information regarding the correlation between a selected answer and an R, G or B designation.

//////////

CVAC Classification Questionnaire

Please answer the following questions as accurately as possible. This will insure that your personalized sessions will be more effective.

1. Which best fits you?
 a. I am small boned. (GREEN OR "G")
 b. I am medium boned. (RED OR "R")
 c. I am large boned. (BLUE OR "B")
2. What is most true about you?
 a. It is hard for me to gain weight. (G)
 b. I gain weight very easily. It's hard for me to lose weight. (B)
 c. My weight stays about the same no matter what I do. (R)
3. What is most true?
 a. I sweat easily and sometimes a lot. (B)
 b. I don't sweat hardly at all. (G)
 c. I sweat on average when I get over-heated or when I work out. (R)
4. Which most applies to you?
 a. My hair is very curly or kinky. (B)
 b. My hair is straight. (G)
 c. My hair is wavy. (R)
5. Which is most true?
 a. I do best when I work out steadily and pace myself. (B)
 b. The harder I hit my workout, the better I do. (G)
 c. I do best when I work out in bursts and take breaks. (R)
6. My appetite is:
 a. Scanty; I eat to live. (G)
 b. Very good, sometimes unbearable; I live to eat. (R)
 c. Slow, steady and rhythmic. (B)
7. I get thirsty:
 a. From time to time. (B)
 b. Most of the time. (R)
 c. Rarely. (G)
8. Which statement best describes you?
 a. Many times, I notice that I'm too cold in a room when other people are saying they are comfortable. (G)
 b. Many times, I notice that I'm to hot in a room when other people are saying they are comfortable. (R)
 c. I'm usually comfortable in most places. (B)
9. Which best fits you?
 a. When I wake up in the morning, I usually feel cold. (G)
 b. When I wake up in the morning, I usually feel warm. (R)
 c. I'm not usually aware of feeling cold or warm when I awaken. (B)
10. When I awaken:
 a. Give me just a few minutes. Then I'm alert and ready to go. (G)
 b. I'm alert and ready to go as soon as my eyes are open. (R)
 c. I need some time to fully wake up. (B)
11. Which most applies to you?
 a. When I'm under extreme stress, I tend to sweat and my heartbeat increases moderately. (R)
 b. When I'm under extreme stress, I tend to get nervous and shaky. Sometimes I turn pale and my heart feels like it flutters. (G)
 c. When I'm under extreme stress, I slow down and take it one step at a time. My body doesn't react much. (B)

//////////

There are three covalent factors that are considered in the cyclic variations in altitude conditioning process. They are baro-stress (pressure), thermo-stress (temperature) and hypoxic-stress (deficiency of oxygen). Still, the whole process is based upon a living system's consistent and predictable tendency of creating survival adaptations to environmental changes. One useful indicator that a user has been classified into an improper group would be the presence of a flattening of effect. This may be remedied by retesting and reclassifying the user into a more proper or correct group.

Flattening is a common phenomena encountered in many physical conditioning and therapeutic modalities. Its cause is over-repetition of a specific pattern to the point where the body no longer responds to the stimulus and can even produce paradoxical responses. An example of this might be where a man decides to build up his arms and shoulders by doing push-ups. So the man does the same number of push-ups every day. After a while, the man would notice that he wasn't getting any results from the push-ups, and may even notice that his arms and shoulders might even appear to be losing strength. This is a classic flattening of effect. This can happen with any physical stimulus. Thus, in the cyclic variations in altitude conditioning program, the pattern may be modified to avoid this flattening of effect. Flattening is not productive, and should be avoided. Accordingly, each user's program should be structured to allow for continued gains.

There is an approach behind the above-stated goals. It is based upon the known predictability of the 12 body types and the consistent actions that have been observed (in many cases serendipitously) in the application of short aggressive sessions with patterns of environmental change that produces the desired effects. It all goes back to the premise that the body (all living systems) create tactics to survive the environment in which they are placed. If these tactics are useful or successful, the chances for the survival of the living system is concomitantly enhanced. This is applicable not only to long-term tactics but to short term tactics as well. Thus, through the institution of a short-term pattern, one can cause a living system to respond in a predictable manner. This is just reasserting the notion that the organism is doing what it is designed to do, i.e., survive. This would be the case whether one is instituting a pattern that improves peristalsis and the production of digestive enzymes (to improve the absorption of nutrients), or whether one is improving the fluid balance and detoxification process in the case of jet lag.

This is most succinctly observed in the field of "biometeorology" (a science that deals with the relationship between living things and atmospheric phenomena). It is well documented that weather patterns (multiple changes in temperature and pressure over time) have significant impact on all living systems. Even tidal factors are patterns that to which living systems react. These reactions and adaptations that living systems create, to survive and thrive through such changes, are commonly referred to as "homeostasis". If an organism is incapable of adaptation to changing patterns of environment, extinction is the eventual outcome. *The Journal of Cycles* is a notable source of documentation on the effect of patterns of change on living systems. Also, the journal of the *International Society of Biometeorology* is another excellent source of documentation on the effect of changes of environment on the survival (to name one subject) of living systems and/or organisms.

Real-Time Monitoring of A User For Real-Time Modifications to A Predetermined Program As discussed above, the present invention contemplates the use of a plurality of predetermined programs of cyclic variations in altitude conditioning for a plurality of human body types, based upon a plurality of the above-mentioned factors. However, if a physically fit person were regularly using this system and methodology for physical conditioning, and then stopped exercising for an extended period of time due to an injury, it is possible that upon the user's return to using the system, the master controller 10 will assume that the user is still at a high level of physical fitness, as recorded in the master controller 10 database, based upon the user's last session. Thus, it is desirable to provide a user an option to utilize a means of real-time monitoring of the user for real-time modifications to the selected predetermined program, such that the program is better suited to the present physical state or condition of the user.

In a preferred embodiment, one or more user sensors (not shown) may be placed in electrical communication with the on-board interface 44 such that sensor readings made inside the pressure vessel 40 can be monitored by the kiosk controller 20. The one or more user sensors may include sensors to measure the body temperature of the user, the heart-rate of the user, the blood-pressure of the user, the blood-oxygen level of the user, as well as other aspects of a person's physical state of being, also referred to as parameters of a user's body condition. It is understood that the use of the term "user sensors" covers both active sensors, such as sensors placed directly on the body for measurement of heart rate or blood pressure, as well as passive sensors, such as sensors based upon technologies such as lasers for determining body temperature without direct physical contact between the user and the user sensor. The kiosk controller 20 would incorporate software capable of monitoring the readings of such user sensors, and then determine whether the user is best suited to the current predetermined program, or whether, based upon the readings, an alternative program or a modification to the program, would be better suited to the user in the user's current physical state of being. In other words, the software is designed to take a reading of a measured parameter of a user's body condition to determine whether it is sufficiently within the range of the corresponding program. If the measured parameter of a user's body condition is deemed sufficiently outside of such range, then the software will determine whether an alternate program, or a modification to the current program, will be better suited for the current user in the current user's state of being. In a real-time program, a classification template for different body types would be utilized. A continuous infrared scan is used with a pattern recognition program to index, or make note of, the distribution and changes of heat in the body. Also, a continuous measurement of local frequencies related to the body (i.e. the core to extremities) would begin. As the session begins, an initial set of maneuvers would be instituted based on the starting levels that were sensed. In order to ensure accuracy, the system may be calibrated before and after each session. Using a pattern recognition program, each pattern that the program received (such as frequency, infrared and oxygen levels) would cause a corresponding response of patterns of maneuvers that correlated to the specific data patterns. The individual elements would not elicit any actions by themselves, but the patterns that they created would. In other words, it would be like a slide show. Every few seconds, a slide (data pattern) would present itself to the controller (program). This would be sorted to the nearest matching response (set of maneuvers), and since the slides would be coming every few seconds, the maneuvers would be going through updates very often. A coordinating program would be utilized to ensure that no set of maneuvers, once started, would cause a conflict in the predetermined rules set out for the session (this would prevent the cyclic variations in altitude from going up and down and the same time).

It is understood that the above-description of the system and methods for cyclic variations in altitude conditioning are described in conjunction with a preferred embodiment, as well as a listing of some alternative embodiments, and that not all contemplated embodiments or methodologies of the present invention are exhaustively disclosed herein, since such expansion of the scope of the contemplated embodiments or methodologies of the present invention are to be understood by persons of ordinary skill in the art. For example, it is understood that there are various ways of designing an airtight seal around a vessel, and the scope of the invention is not meant to be limited by the flange and gasket approach. Furthermore, there are various ways of designing and implementing a proportioning valve for releasing pressure from a vessel, and various ways of ensuring that a vessel canopy remains closed during a session other than through the use of an electromagnetic clamp. Moreover, there are various ways of designing a canopy that opens automatically, or with assist from a spring-loaded apparatus. All of these approaches, as described in the detailed description of a preferred embodiment, are meant to be illustrative of an apparatus that enables the practice of the present invention, and is not intended to be limited to such structural elements.

Finally, when determining whether a certain program is better suited to a certain body type, or state of physical being, it is not the intent of the present invention to claim that the matching of a particular program to a particular body type is the exact, proper, and most optimal combination of program and body type. Rather, the present invention is based upon the concept that for a given body type, or state of physical being, a method or program of cyclic variations in altitude conditioning can be predetermined, or modified in real-time, to provide results that subject a user to more beneficial transitions between simulated altitudes that the typical session of extended exposure to a pressurized environment.

What is claimed is:

1. An apparatus, comprising:

a pressure vessel capable of being opened to receive a user and closed to create a hermetic seal;

said pressure vessel including an on-board interface capable of enabling a user to control one or more functions of said pressure vessel, a pressure transducer capable of monitoring air pressure inside said pressure vessel, and a user sensor capable of measuring one or more parameters of a user's body condition, said user sensor being in electrical communication with said on-board interface;

a blower capable of removing air from said pressure vessel;

a proportioning valve capable of controlling the amount of air allowed to enter into said pressure vessel, said on-board interface configured to initiate a session of cyclic variations in altitude conditioning upon initiation by a user at a first time period, said session including a predetermined program configured to regulate cyclic variations of altitude within said pressure vessel, said on-board interface configured to cause a change to said predetermined program at a second time period based on a signal received from said user sensor; and a controller electrically coupled to the pressure vessel, the controller configured to classify the user into one of a predetermined number of body type categories, the controller configured to select the program based on the classification.

2. The apparatus of claim 1, wherein said on-board interface is placed in electrical communication with said blower, said proportioning valve and said pressure transducer, said on-board interface configured to initiate said session of cyclic variations in altitude conditioning by cyclically operating said blower to create a negative pressure in said pressure vessel and by cyclically operating said proportioning valve to introduce air into said pressure vessel to reduce the negative pressure up to the point of atmospheric pressure.

3. The apparatus of claim 1, wherein said on-board interface is configured to monitor signals from said user sensor to determine whether at least one value associated with a measured parameter of a user's body condition is at a level sufficient to warrant a modification of said predetermined program regulating cyclic variations in altitude-within said pressure vessel.

4. The apparatus of claim 3, wherein said on-board interface is configured to modify said predetermined program regulating the cyclic variations in altitude within the pressure vessel if the at least one value of a measured parameter of a user's body condition is at a level sufficiently outside a predetermined range for said predetermined program.

5. The apparatus of claim 1, wherein said session is a first session, said on-board interface is configured to cause said first session to be stopped and a second session different than said first session to be initiated during said second time period based on a signal received from said user sensor.

6. The apparatus of claim 1, wherein the controller is in electrical communication with said blower, said proportioning valve and said pressure transducer, the controller configured to initiate said session of cyclic variations in altitude conditioning by cyclically operating said blower to create a negative pressure in said pressure vessel and by cyclically operating said proportioning valve to introduce air into said pressure vessel to reduce the negative pressure up to the point of atmospheric pressure.

7. The apparatus of claim 6, wherein said user sensor is in electrical communication with the controller, the controller configured to monitor signals from said user sensor to determine whether at least one value of a measured parameter of a user's body condition is at a level sufficient to warrant a modification of said predetermined program regulating cyclic variations in altitude conditioning.

8. The apparatus of claim 7, wherein the controller is configured to modify the predetermined program regulating the cyclic variations in altitude if said at least one value of a measured parameter of a user's body condition is at a level sufficiently outside a predetermined range for said predetermined program.

9. The apparatus of claim 7, wherein said predetermined program is a first predetermined program, the controller being configured to select a second predetermined program for regulating the cyclic variations in altitude conditioning when said at least one value of a measured parameter of a user's body condition is at a level sufficiently outside a predetermined range for said first predetermined program.

10. The apparatus of claim 1, wherein said pressure vessel includes an opening defined in a wall of said pressure vessel and said pressure vessel includes a panel disposed over said opening, said panel configured to rupture when a pressure within said pressure vessel exceeds a predetermined threshold pressure.

11. The apparatus of claim 1, wherein said on-board interface is configured to receive user payment information to pay for a session of cyclic variations in altitude conditioning.

12. The apparatus of claim 1, wherein said on-board interface is disposed inside said pressure vessel.

13. A system for cyclic variations in altitude conditioning comprising:

a pressure vessel unit;

a kiosk controller; and a master controller, said pressure vessel unit including a pressure vessel, a blower, and a proportioning valve, said pressure vessel capable of being opened to receive a user and closed to create a hermetic seal, said pressure vessel including an on-board interface capable of enabling a user to control one or more functions of said pressure vessel unit, a pressure transducer capable of monitoring air pressure inside said pressure vessel, and a user sensor capable of measuring one or more parameters of a user's body condition, said user sensor being in electrical communication with said on-board interface, said on-board interface configured to initiate a session of cyclic variations in altitude conditioning upon initiation by a user at a first time period, said session including a predetermined program configured to regulate cyclic variations of altitude within said pressure vessel unit, said on-board interface configured to cause a change to said predetermined program at a second time period based on a signal received from said user sensor, said blower capable of removing air from said pressure vessel, said proportioning valve capable of controlling the amount of air allowed to enter into said pressure vessel;

said kiosk controller including a first software program, and an information processing system capable of executing said first software program, said kiosk controller being in electrical communication with said master controller and said on-board interface, the kiosk controller configured to classify the user into one of a predetermined number of body type categories, the kiosk controller configured to select the program based on the classification, said master controller including a second software program and an information processing system capable of executing said second software program, said master controller being in electrical communication with said on-board controller of said pressure vessel unit.

14. The system of claim 13, wherein said on-board interface is placed in electrical communication with said blower, said proportioning valve and said pressure transducer, said on-board interface being configured to initiate said session of cyclic variations in altitude conditioning by cyclically operating said blower to create a negative pressure in said pressure vessel and by cyclically operating said proportioning valve to introduce air into said pressure vessel to reduce the negative pressure up to the point of atmospheric pressure.

15. The system of claim 13, wherein said on-board interface is configured to monitor signals from said user sensor to determine whether at least one value associated with a measured parameter of a user's body condition is at a level sufficient to warrant a modification of said predetermined program regulating cyclic variations in altitude-within said pressure vessel unit.

16. The system of claim 15, wherein said on-board interface is configured to modify said predetermined program regulating the cyclic variations in altitude within said pressure vessel unit if said at least one value of a measured parameter of a user's body condition is at a level sufficiently outside a predetermined range for said-predetermined program.

17. The system of claim 15, wherein said session is a first session, said on-board interface is configured to cause said first session to be stopped and a second session different than said first session to be initiated during said second time period based on a signal received from said user sensor.

18. The system of claim 13, wherein said kiosk controller is in electrical communication with said blower, said proportioning valve and said pressure transducer, said kiosk controller being configured to initiate said session of cyclic variations in altitude conditioning by cyclically operating said blower to create a negative pressure in said pressure vessel and by cyclically operating said proportioning valve to introduce air into said pressure vessel to reduce the negative pressure up to the point of atmospheric pressure.

19. The system of claim 18, wherein said user sensor is in electrical communication with said kiosk controller, said kiosk controller configured to monitor signals from said user sensor to determine whether at least one value of a measured parameter of a user's body condition is at a level sufficient to warrant a modification of said predetermined program regulating cyclic variations in altitude conditioning.

20. The system of claim 16, wherein said kiosk controller is configured to modify said predetermined program regulating the cyclic variations in altitude if said at least one value of a measured parameter of a user's body condition is at a level sufficiently outside a predetermined range for said predetermined program.

21. The system of claim 19, wherein said predetermined program is a first predetermined program, said kiosk controller is configured to select a second predetermined program regulating cyclic variations in altitude if said at least one value of a measured parameter of a user's body condition is at a level sufficiently outside a predetermined range for said first predetermined program.

22. The system of claim 13, wherein said information processing system executing said first software program is configured to receive signals from said user sensor to determine whether at least one value of a measured parameter of a user's body condition is sufficient to warrant a modification of said predetermined program regulating cyclic variations in altitude, and making such modification if such measured parameter is sufficient.

23. The system of claim 13, wherein said information processing system executing said first software program is configured to receive signals from said user sensor to determine whether at least one value of a measured parameter of a user's body condition is at a level sufficient to warrant a selection of an alternate predetermined program regulating cyclic variations in altitude, and making such alternate selection if such measured parameter is deemed sufficient.

24. The system of claim 13, wherein said master controller is located in a separate facility from said kiosk controller and said pressure vessel unit.

25. The system of claim 13, wherein said master controller is configured to store user data entered into and stored on at least one of said kiosk controller or said on-board interface.

26. The system of claim 25, wherein said master controller is configured to make said data stored on said master controller available to a second kiosk controller in electrical communication with said master controller, such that a user can use said stored data to operate a second pressure vessel unit in electrical communication with said second kiosk controller.

27. The apparatus of claim 13, wherein said on-board interface is disposed inside said pressure vessel.

28. A method of controlling a user's use of a system for cyclic variations in altitude conditioning comprising:

making a system for cyclic variations in altitude conditioning available to a user, said system including, a pressure vessel unit, a kiosk controller, and a master controller, said pressure vessel unit including, a pressure vessel capable of being opened to receive a user and closed to create a hermetic seal, said pressure vessel including an on-board interface capable of enabling a user to control one or more functions of said pressure vessel unit, a pressure transducer capable of monitoring air pressure inside said pressure vessel, and a user sensor capable of measuring one or more parameters of a user's body condition, said user sensor being in electrical communication with said on-board interface, said on-board interface configured to initiate a session of cyclic variations in altitude conditioning upon initiation by a user at a first time period, said session including a predetermined program configured to regulate cyclic variations of altitude within said pressure vessel unit, said on-board interface configured to cause a change to said predetermined program at a second time period based on a signal received from said user sensor, a blower capable of removing air from said pressure vessel, and a proportioning valve capable of controlling the amount of air allowed to enter into said pressure vessel, said kiosk controller including, a first software program, and an information processing system capable of executing said first software program, said kiosk controller being in electrical communication with master controller and said on-board interface, the kiosk controller configured to classify the user into one of a predetermined number of body type categories, the kiosk controller configured to select the program based on the classification, said master controller including, a second software program, and an information processing system capable of executing said second software program, and said master controller being in electrical communication with said on-board controller; and allowing said user to pay for a session of cyclic variations in altitude conditioning in said system via the entry of payment information relating to the user into said kiosk controller.

29. The method of claim 28, further comprising:

transferring to said master controller, data associated with a user stored on said kiosk controller.

30. The method of claim 29, wherein said master controller is located in a different facility from said kiosk controller.

31. The method of claim 29 , further comprising:

monitoring one or more parameters of the user's body condition to determine whether at least one value of a measured parameter of the user's body condition is at a level sufficient to warrant a modification of said predetermined program regulating cyclic variations in altitude conditioning.

32. The method of claim 31, further comprising:

modifying said predetermined program regulating the cyclic variations in altitude conditioning if said at least one value of a measured parameter of a user's body condition is at a level outside a predetermined range for said predetermined program.

33. The method of claim 31, wherein the predetermined program is a first predetermined program, the method further comprising:

selecting a second predetermined program for regulating the cyclic variations in altitude conditioning if said at least one value of a measured parameter of a user's body condition is at a level outside a predetermined range for said first predetermined program.

34. The method of claim 28, wherein the system is a first system, the kiosk controller is a first kiosk controller, the method further comprising:

allowing a user to utilize a second system including a second kiosk controller by uploading data associated with said user from said master controller to said second kiosk controller.

35. The method of claim 28, wherein the system is a first system, the kiosk controller is a first kiosk controller, the method further comprising:

allowing a user to utilize a second system including a second kiosk controller by providing data associated with the user entered by said user at said first system available for access from said master controller by said second kiosk controller.

36. The method of claim 28, further comprising the step of:

verifying a user's completion of a set-up session; and after the verifying, allowing the user to initiate a session of cyclic variations in altitude conditioning.

37. The method of claim 28, further comprising:

accessing data related to a user from at least one of said kiosk controller or said master controller; and based on said data, determining a suitable program for the user based at least in part upon the user's history of use.

38. A method for providing cyclic variations in altitude conditioning, comprising:

classifying a user into one of a predetermined number of body type categories;

selecting a cyclic variations in altitude conditioning program based upon the classification;

executing a session of cyclic variations in altitude conditioning within a pressure vessel, said session including a predetermined program configured to cause rapid transitions between simulated altitudes in said pressure vessel according to cycles determined by said predetermined program;

measuring via a user sensor at least one parameter of a user's body condition during said session; and determining whether a value of said at least one measured parameter is within a predetermined range, and if within said predetermined range, allowing said predetermined program to continue, and if not within said predetermined range, modifying said predetermined program in real time, said modification based at least in part upon the classification and said value of said at least one measured parameter.

39. The method of claim 38, further comprising:

prior to the executing the session, receiving payment information via an on-board interface coupled to said pressure vessel.

40. The method of claim 38, further comprising:

prior to the executing said session, receiving payment information via a kiosk controller coupled to said pressure vessel.

41. The method of claim 38, further including:

prior to the classifying, receiving data entered by a user; and prior to the executing said session, executing a set-up session in said pressure vessel.

42. A method for providing cyclic variations in altitude conditioning, comprising:

classifying a user into one of a predetermined number of body type categories;

selecting a cyclic variations in altitude conditioning program based upon the classification;

executing a first session of cyclic variations in altitude conditioning within a pressure vessel, said first session including a first predetermined program configured to cause rapid transitions between simulated altitudes in said pressure vessel according to cycles determined by said first predetermined program;

measuring via a user sensor at least one parameter of a user's body condition during said first session; and determining whether a value of said at least one measured parameter is within a predetermined range, and if within said predetermined range, allowing said first predetermined program to continue, and if not within said predetermined range, initiating in real time a second session of cyclic variations in altitude conditioning within said pressure vessel, said second session being different than said first session, said second session including a second predetermined program configured to cause rapid transitions between simulated altitudes in said pressure vessel according to cycles determined by said second predetermined program based upon the classification and the user's current body condition.

43. The method of claim 42, further comprising:

prior to the executing said first session, receiving payment information via an on-board interface coupled to said pressure vessel.

44. The method of claim 42, further comprising:

prior to the executing said first session, receiving payment information via a kiosk controller coupled to said pressure vessel.

45. The method of claim 42, further including:

prior to the classifying, receiving data entered by a user; and prior to the executing said first session, executing a set-up session in said pressure vessel.

* * * * *